US007379518B2

(12) United States Patent
Dick et al.

(10) Patent No.: US 7,379,518 B2
(45) Date of Patent: May 27, 2008

(54) BASE STATION SYNCHRONIZATION

(75) Inventors: Stephen G. Dick, Nesconset, NY (US); Eldad Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 11/257,534

(22) Filed: Oct. 25, 2005

(65) Prior Publication Data
US 2006/0034407 A1 Feb. 16, 2006

Related U.S. Application Data

(63) Continuation of application No. 10/075,698, filed on Feb. 14, 2002, now Pat. No. 6,980,615, which is a continuation of application No. 09/826,547, filed on Apr. 5, 2001, now Pat. No. 6,961,398.

(60) Provisional application No. 60/223,405, filed on Aug. 4, 2000, provisional application No. 60/195,543, filed on Apr. 7, 2000.

(51) Int. Cl.
*H04L 7/00* (2006.01)
(52) U.S. Cl. ...................... 375/356; 455/423
(58) Field of Classification Search ............... 375/356, 375/358; 455/423
See application file for complete search history.

(56) References Cited

U.S. PATENT DOCUMENTS

| | | | |
|---|---|---|---|
| 5,313,457 A | 5/1994 | Hostetter et al. | |
| 5,448,570 A | 9/1995 | Toda et al. | |
| 5,809,426 A | 9/1998 | Radojevic et al. | |
| 5,828,659 A * | 10/1998 | Teder et al. | ................ 370/328 |
| 5,881,100 A | 3/1999 | Durrant et al. | |
| 5,910,948 A | 6/1999 | Shou et al. | |
| 6,014,376 A | 1/2000 | Abreu et al. | |
| 6,038,250 A | 3/2000 | Shou et al. | |

(Continued)

FOREIGN PATENT DOCUMENTS

EP 0 825 737 2/1998

(Continued)

OTHER PUBLICATIONS

Nyström et al., "Comparision of Cell Search Methods for Asynchronous Wideband CDMA Cellular System," International Conference on Universal Personal Communications, IEEE, New York, NY, US, vol. 2, Oct. 5, 1998, pp. 783-787.

(Continued)

*Primary Examiner*—Kevin Kim
(74) *Attorney, Agent, or Firm*—Volpe and Koenig, P.C.

(57) ABSTRACT

In a radio network controller (RNC), a covariant matrix and a database are updated. The RNC then detects that a first base station's time-error-variance exceeds a predetermined threshold. In response, the RNC signals to a user-equipment (UE) to measure a time difference of arrival (TDOA) between signals transmitted from the first base station and a reference base station. The UE measures the requested TDOA between the designated base stations and reports the measurement results back to the RNC. The RNC then compares the measured TDOA with a TDOA value stored in the database. Based on the comparison, the RNC signals to the first base station to adjust its time base.

11 Claims, 5 Drawing Sheets

U.S. PATENT DOCUMENTS

| | | | |
|---|---|---|---|
| 6,097,709 | A | 8/2000 | Kuwabara |
| 6,131,030 | A | 10/2000 | Schon et al. |
| 6,208,871 | B1* | 3/2001 | Hall et al. .................. 455/517 |
| 6,223,037 | B1 | 4/2001 | Parkkila |
| 6,246,673 | B1 | 6/2001 | Tiedemann et al. |
| 6,363,060 | B1 | 3/2002 | Sarkar |
| 6,480,558 | B1 | 11/2002 | Ottosson et al. |
| 6,493,380 | B1* | 12/2002 | Wu et al. .................. 375/224 |
| 6,504,830 | B1 | 1/2003 | Ostberg et al. |
| 6,590,881 | B1 | 7/2003 | Wallace et al. |
| 6,597,914 | B1* | 7/2003 | Silventoinen et al. .... 455/456.1 |
| 6,728,297 | B2 | 4/2004 | Rudolf |
| 6,882,727 | B1* | 4/2005 | Vialen et al. ................. 380/33 |
| 2002/0075978 | A1 | 6/2002 | Dick et al. |
| 2002/0146039 | A1 | 10/2002 | Demir et al. |
| 2003/0203745 | A1 | 10/2003 | Chiang et al. |

FOREIGN PATENT DOCUMENTS

| | | |
|---|---|---|
| EP | 0 838 910 | 4/1998 |
| EP | 0852430 | 7/1998 |
| EP | 0954122 | 11/1999 |
| JP | 08-163002 | 6/1996 |
| JP | 0852430 | 7/1998 |
| JP | 10-246769 | 9/1998 |
| JP | 0954122 | 11/1999 |
| TW | 378440 | 1/2000 |
| TW | 387186 | 4/2000 |
| TW | 391101 | 5/2000 |
| TW | 421941 | 2/2001 |
| WO | 94/28643 | 12/1994 |
| WO | 99/00912 | 1/1999 |
| WO | 99/19992 | 4/1999 |
| WO | 99/30519 | 6/1999 |
| WO | 99/43099 | 8/1999 |
| WO | 99/44306 | 9/1999 |
| WO | 99/66754 | 12/1999 |
| WO | 00/04661 | 1/2000 |
| WO | 00/14907 | 3/2000 |
| WO | 00/31998 | 6/2000 |
| WO | 00/44117 | 7/2000 |
| WO | 01/01596 | 1/2001 |
| WO | 01/10160 | 2/2001 |
| WO | 01/41482 | 6/2001 |
| WO | 02/058334 | 7/2002 |

OTHER PUBLICATIONS

Yahata, "Autonomous Master-Slave Frame Synchronization Among Microcellular Base Stations," Electronics & Communications in Japan, Part I—Communications, Scripta Technica, New York, US, vol. 82, No. 4, Apr. 1999, pp. 1-13.

Nielsen et al., "WCDMA Initial Cell Search", VTC 2000-Fall, IEEE VTS 52nd, Vehicular Technology Conference, vol. 1 of 6, Conf. 52, Sep. 2000, pp. 377-383.

Higuchi et al., "Experimental Evaluation of 3-Step Cell Search Method in W-CDMA Mobile Radio," VTC 2000 IEEE, 0-7803-5718-3, pp. 303-307.

Wang et al., "Cell Search In W-CDMA," IEEE Journal on Selected Areas in Communications, vol. 18, No. 8, Aug. 2000, pp. 1470-1482.

"Universal Mobile Telecommunications System (UMTS); UE Procedures in Idle Mode and Procedures for Cell Reselection in Connected Mode" (3GPP TS 25.304 version 3.5.0 Release 1999).

"UMTS Terrestrial Radio Access Concept Evaluation," ETSI Technical Report, XX, XX, Dec. 1997, pp. 47-48.

Yahata, "Autonomous Master-Slave Frame Synchronization Among Microcellular Base Stations," Electronics & Communications in Japan, Part I-Communications, Scripta Technica, New York, US, vol. 82, No. 4, Apr. 1999, pp.1-13.

Nielsen et al., "WCDMA Initial Cell Search", VTC 2000-Fall, IEEE VTS 52nd, Vehicular Technology Conference, vol. 1 of 6, Conf. 52, Sep. 2000, pp. 377-383.

Higuchi et al., "Experimental Evaluation of 3-Step Cell Search Method in W-CDMA Mobile Radio," VTC 2000 IEEE, 0-7803-5718-3, pp. 303-307.

Wang et al., "Cell Search In W-CDMA," IEEE Journal on Selected Areas in Communications, vol. 18, No. 8, Aug. 2000, pp. 1470-1482.

"Universal Mobile Telecommunications System (UMTS); UE Procedures in Idle Mode and Procedures for Cell Reselection in Connected Mode" (3GPP TS 25.304 version 3.5.0 Release 1999).

Universal Mobile Telecommunications System (UMTS); UMTS Terrestrial Radio Access (UTRA) Concept evaluation; (UMTS 30.06 version 3.0.0); TR 101 146 V3.0.0 (1997-12); pp. 47-49.

3rd Generation Partnership Project; Technical Specification Group Radio Access Network; Physical channels and mapping of transport channels onto physical channels (FDD) (3G TS 25.211 cersion 3.1.0); 3G TS 25.211 V3.1.1 (1999-12).

3rd Generation Partnership Project; Technical Specification Group Radio Access Network; Physical channels and mapping of transport channels onto physical channels (FDD) (Release 4); 3G TS 25.211 V4.1.0 (2001-06).

3rd Generation Partnership Project; Technical Specification Group Radio Access Network; Spreading and modulation (FDD) (Release 1999); 3G TS 25.213 V3.4.0 (2000-12).

3rd Generation Partnership Project; Technical Specification Group Radio Access Network; Apreading and modulation (FDD) (Release 4); 3G TS 25.213 V4.1.0 (2001-06).

3GPP, "Universal Mobile Telecommunications System (UMTS); UE Procedures in Idle Mode and Procedures for Cell Reselection in Connected Mode," 3GPP TS 25.304 V3.5.0 (Release 1999) (Dec. 2000).

3GPP, "Universal Mobile Telecommunications System (UMTS); UE Procedures in Idle Mode and Procedures for Cell Reselection in Connected Mode," 3GPP TS 25.304 V3.5.0 (Release 1999) (Mar. 2000).

3GPP, "Universal Mobile Telecommunications System (UMTS); UE Procedures in Idle Mode and Procedures for Cell Reselection in Connected Mode," 3GPP TS 25.304 V3.5.0 (Release 1999) (Mar. 2001).

3GPP, "3rd Generation Partnership Project; Technical Specification Group Radio Access Network; Physical channels and mapping of transport channels onto physical channels (FDD) (Release 1999)," 3GPP TS 25.211 V3.1.0, (Dec. 1999).

3GPP, "3rd Generation Partnership Project; Technical Specification Group Radio Access Network; Spreading and modulation (FDD) (Release 1999)," 3GPP TS 25.213 V3.4.0 (Dec. 2000).

3GPP, "3rd Generation Partnership Project; Technical Specification Group Radio Access Network; Physical channels and mapping of transport channels onto physical channels (FDD) (Release 1999)," 3GPP TS 25.211 V3.2.0, (Mar. 2000).

3GPP, "3rd Generation Partnership Project; Technical Specification Group Radio Access Network; Physical channels and mapping of transport channels onto physical channels (FDD) (Release 1999)," 3GPP TS 25.211 V3.5.0, (Dec. 2000).

3GPP, "3rd Generation Partnership Project; Technical Specification Group Radio Access Network; Spreading and modulation (FDD) (Release 1999)," 3GPP TS 25.213 V3.2.0, (Mar. 2000).

3GPP, "3rd Generation Partnership Project; Technical Specification Group Radio Access Network; Spreading and modulation (FDD) (Release 1999)," 3GPP TS 25.213 V3.5.0, (Apr. 2001).

3GPP, "Third Generation Partnership Project; Technical Specification Group Radio Access Network; Synchronisation in UTRAN Stage 2 (Release 1999)," 3G TS 25.402 V3.1.0, (Mar. 2000).

3GPP, "Third Generation Partnership Project; Technical Specification Group Radio Access Network; Synchronisation in UTRAN Stage 2 (Release 1999)," 3G TS 25.402 V3.4.0, (Dec. 2000).

3rd Generation Partnership Project; Technical Specification Group Radio Access Network; Physical channels and mapping of transport channels into physical channels (FDD) (Release 4);3G.TS 25.211 V4.1.0, (Jun. 2001).

3rd Generation Partnership Project; Technical Specification Group Radio Access Network; Spreading and modulation (FDD) (Release 4);3G TS 25.213 V4.1.0, (Jun. 2001).

Higuchi et al., "Experimental Evaluation of 3-Step Cell Search Method in W-CDMA Mobile Radio," VTC 2000 IEEE, 0-7803-5718-3, pp. 303-307.

Nielsen et al., "WCDMA Initial Cell Search", VTC 2000-Fall, IEEE VTS 52[52], Vehicular Technology Conference, vol. 1 of 6, Conf. 52, pp. 377-383, (Sep. 2000).

Nystrom et al., "Comparison of Cell Search Methods for Asynchronous Wideband CDMA Cellular System," International Conference on Universal Personal Communications, IEEE, vol. 2, pp. 783-787 (Oct. 5, 1998).

Universal Mobile Telecommunications System (UMTS); UMTS Terrestrial Radio Access (UTRA) Concept evaluation; (UMTS 30.06 version 3.0.0); TR 101 146 V3.0.0, pp. 47-49, (Dec. 1997).

Wang et al., "Cell Search In W-CDMA," IEEE Journal on Selected Areas in Communications, vol. 18, No. 8, pp. 1470-1482 (Aug. 2000).

Yahata, "Autonomous Master-Slave Frame Synchronization Among Microcellular Base Stations," Electronics & Communications in Japan, Part I-Communications, Scripta Technica, vol. 82, No. 4, pp. 1-13 (Apr. 1999).

3GPP, "Universal Mobile Telecommunications System (UMTS); UE Procedures in Idle Mode and Procedures for Cell Redelection in Connected Mode," 3GPP TS 25.304 V3.5.0 (Release 1999) (Dec. 2000).

3GPP, "Universal Mobile Telecommunications System (UMTS); UE Procedures in Idle Mode and Procedures for Cell Redelection in Connected Mode," 3GPP TS 25.304 V3.2.0 (Release 1999) (Mar. 2000).

3GPP, "Universal Mobile Telecommunications System (UMTS); UE Procedures in Idle Mode and Procedures for Cell Redelection in Connected Mode," 3GPP TS 25.304 V3.6.0 (Release 1999) (Mar. 2001).

3GPP, "3rd Generation Partnership Project; Technical Specification Group Radio Access Network; Physical channels and mapping of transport channels onto physicals channels (FDD) (Release 1999)," 3GPP TS 25.211 V3.1.0), (Dec. 1999).

3GPP, "3rd Generation Partnership Project; Technical Specification Group Radio Access Network; Spreading and Modulation (FDD) (Release 1999)," 3GPP TS 25.213 V3.4.0), (Dec. 2000).

3GPP, "3rd Generation Partnership Project; Technical Specification Group Radio Access Network; Physical channels and mapping of transport channels onto physicals channels (FDD) (Release 1999)," 3GPP TS 25.211 V3.2.0), (Mar. 2000).

3GPP, "3rd Generation Partnership Project; Technical Specification Group Radio Access Network; Physical channels and mapping of transport channels onto physicals channels (FDD) (Release 1999)," 3GPP TS 25.211 V3.5.0), (Dec. 2000).

3GPP, "3rd Generation Partnership Project; Technical Specification Group Radio Access Network; Spreading and modulation (FDD) (Release 1999)," 3GPP TS 25.213 V3.2.0, (Mar. 2000).

3GPP, "3rd Generation Partnership Project; Technical Specification Group Radio Access Network; Spreading and modulation (FDD) (Release 1999)," 3GPP TS 25.213 V3.5.0, (Apr. 2001).

3GPP, "Third Generation Partnership Project; Technical Specification Group Radio Access Network; Synchronisation in UTRAN Stage 2 (Release 1999)," 3G TS 25.402 V3.1.0, (Mar. 2000).

3GPP, "Third Generation Partnership Project; Technical Specification Group Radio Access Network; Synchronisation in UTRAN Stage 2 (Release 1999)," 3G TS 25.402 V3.4.0), (Dec. 2000).

3rd Generation Partnership Project; Technical Specification Group Radio Access Network; Physical channels and mapping of transport channels onto physicals channels (FDD) (Release 4); 3G TS 25.211 V4.1.0 (Jun. 2001).

3rd Generation Partnership Project; Technical Specification Group Radio Access Network; Spreading and modulation (FDD) (Release 4); 3G TS 25.213 V4.1.0 (Jun. 2001).

Higuchi et al., "Experimental Evaluation of 3-Step Cell Search Method in W-CDMA Mobile Radio," VTC 2000 IEEE, 0-7803-5718-3, pp. 303-307.

Nielsen et al., "WCDMA Initial Cell Research", VTC 2000-Fall, IEEE VTS 52nd, Vehicular Technology Conference, vol. 1 of 6, Conf. 52, pp. 377-383, (Sep. 2000).

Nystrom et al., "Comparison of Cell Search Methods for Asynchronous Wideband CDMA Cellular System," International Conference on Universal Personal Communications, IEEE, vol. 2, pp. 783-787 (Oct. 5, 1998).

Universal Mobile Telecommunications System (UMTS); UMTS Terrestrial Radio Access (UTRA) Concept evaluation; (UMTS 30.06 version 3.0.0); TR 101 146 V3.0.0, pp. 47-49, (Dec. 1997).

Wang et al., "Cell Search In W-CDMA," IEEE Journal on Selected Areas in Communications, vol. 18, No. 8, pp. 1470-1482 (Aug. 2000).

Yahata, "Autonomous Master-Slave Frame Synchronization Among Microcellular Base Stations," Electronics & Communications in Japan, Part I-Communications, Scripta Technica, vol. 82, No. 4, pp. 1-13 (Apr. 1999).

* cited by examiner

BASE STATION SYNCHRONIZATION

CROSS REFERENCE TO RELATED APPLICATIONS

This application is a continuation of application Ser. No. 10/075,698, filed on Feb. 14, 2002; now U.S. Pat. No. 6,980,615 which is a continuation of application Ser. No. 09/826,547, filed on Apr. 5, 2001; now U.S. Pat. No. 6,961,398 which claims priority from Provisional Application Nos. 60/223,405, filed on Aug. 4, 2000 and 60/195,543, filed on Apr. 7, 2000

BACKGROUND

The present invention relates generally to digital communication systems. More specifically, the invention relates to a system and method of synchronizing a plurality of base stations in a cellular communication network.

The proposed $3^{rd}$ generation wireless protocols require an approach that is based on a simple, but costly procedure of requiring each base station to be externally synchronized to a highly accurate external source.

Techniques which support base station synchronization require that a base station passively listen to synchronization transmissions from its neighbors, e.g. the synchronization channel (SCH) or the common control physical channel (CCPCH), and follow procedures similar to those performed by user equipment (UE) in order to synchronize. Another approach requires each base station to occasionally send a special synchronization burst in coordination with one or more of its neighbors listening for the transmission. Yet another approach has UEs measure the time difference of arrival of transmissions from each of two cells (TDOA). These techniques utilize a precisely accurate source in every base station. Since each base station has this source, these techniques are costly and inconvenient.

Therefore, there exists a need for a system and method that allows fast, efficient, and less expensive synchronization between operational base stations without consuming additional physical resources.

SUMMARY

The present invention is a method and apparatus for maintaining base stations synchronized in a wireless communication system. The wireless communication system comprises a radio network controller (RNC), at least one user-equipment (UE), and a node B, wherein the node B comprises a plurality of base stations. In the RNC, a covariant matrix and a database are updated. The RNC then detects that a first base station's time-error-variance exceeds a predetermined threshold. In response, the RNC signals to a UE to measure a time difference of arrival (TDOA) between signals transmitted from the first base station and a reference base station. The UE measures the requested TDOA between the designated base stations and reports the measurement results back to the RNC. The RNC then compares the measured TDOA with a TDOA value stored in the database. Based on the comparison, the RNC signals to the first base station to adjust its time base.

DETAILED DESCRIPTION OF THE PREFERRED EMBODIMENTS

Figure 1:
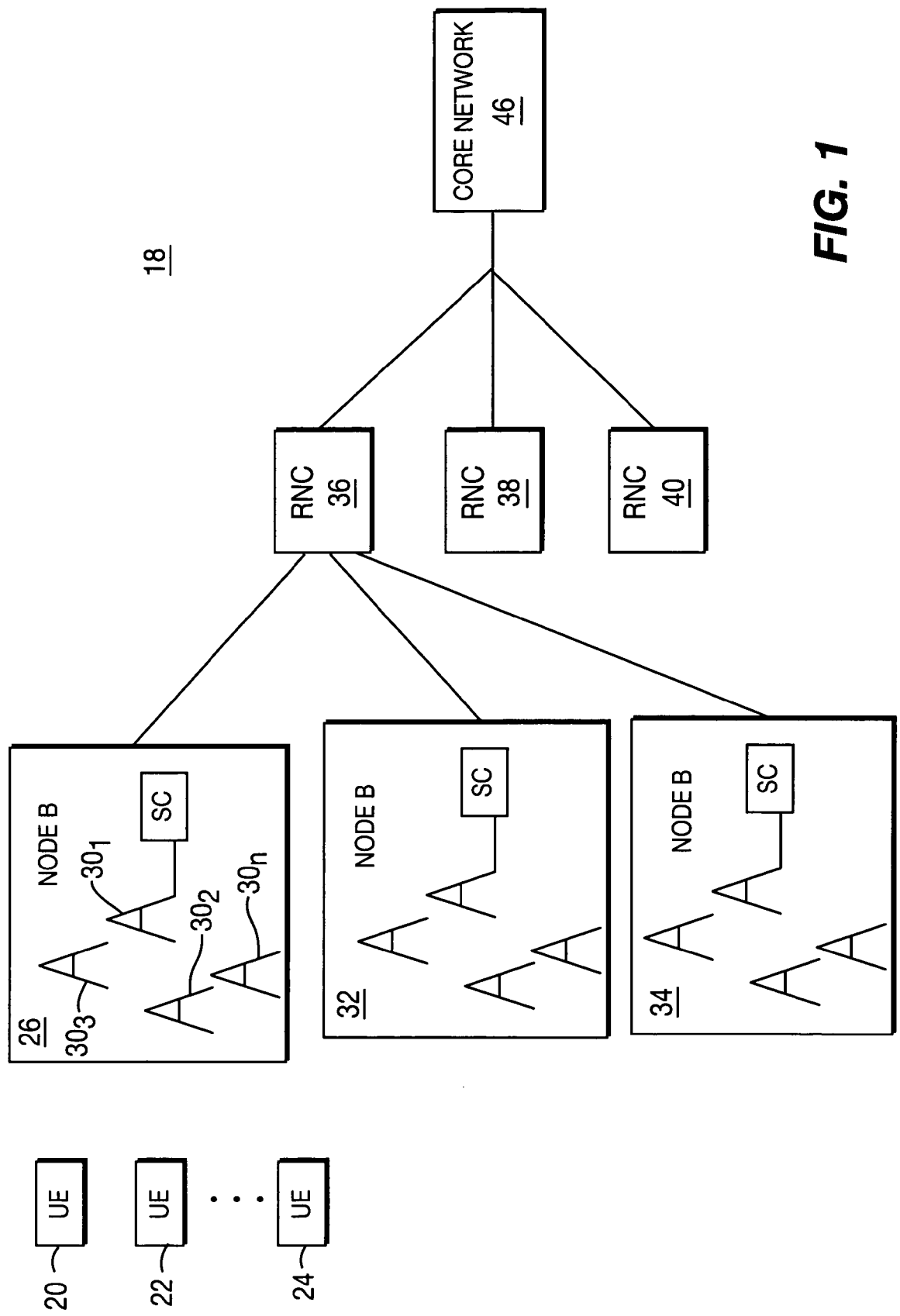
FIG. 1 is a block diagram of a communication system.

The preferred embodiments of the present invention will be described with reference to the drawing figures where like numerals represent like elements throughout.

FIG. 1 illustrates a simplified wireless spread spectrum code division multiple access (CDMA) or time division duplex (TDD) communication system 18. The system 18 comprises a plurality of Node Bs 26, 32, 34, a plurality of RNCs, 36, 38, . . . 40, a plurality of user equipments (UE) 20, 22, 24, and a core network 46. A node B 26 within the system 18 communicates with associated user equipment 20-24 (UE). The node B 26 has a single site controller (SC) 30 associated with either a single base station 30, or multiple base stations $30_1 \ldots 30_n$. Each base station has an associated geographic region known as a cell. It should be known that even though base station synchronization is disclosed, cell synchronization may also be accomplished using the present invention.

A Group of node Bs 26, 32, 34 is connected to a radio network controller (RNC) 36. The RNCs 36 . . . 40 are also connected to the core network 46. For brevity, the following refers to only one node B, but the present invention can be readily applied to multiple node Bs.

Figure 2:
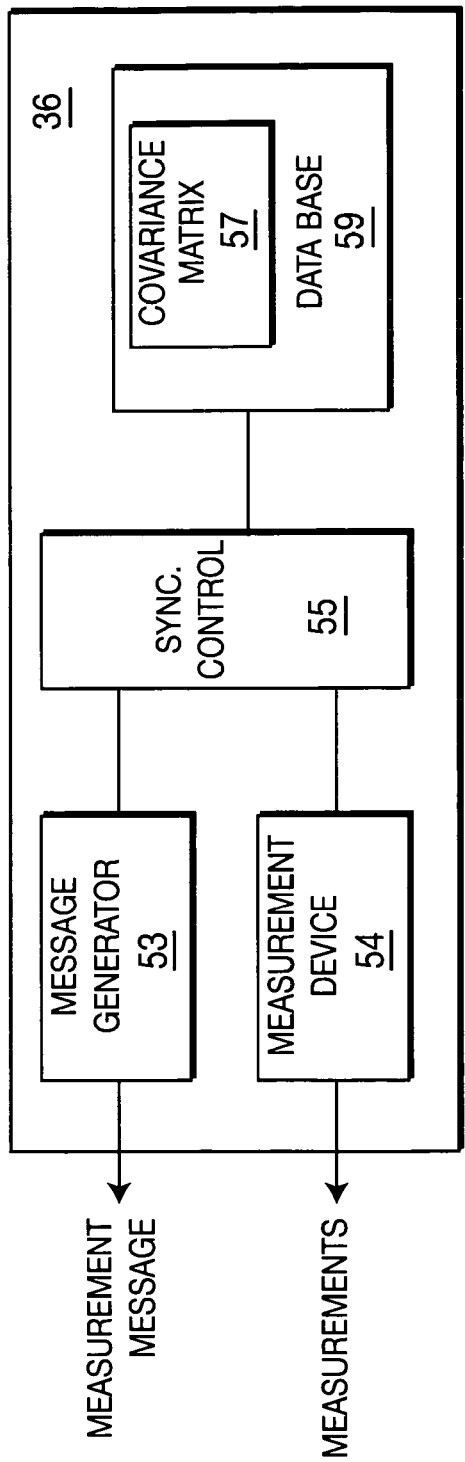
FIG. 2 is a block diagram of a radio network controller (RNC) made in accordance with a preferred embodiment of the present invention.

In accordance with a preferred embodiment, the RNC 36 maintains base station synchronization within and between the node Bs 26, 32, 34. Referring to FIG. 2, the RNC 36 may request measurements from a base station $30_1 \ldots 30_n$ or UE 20, 22, 24 through its message generator 53; receive measurements through its measure receive device 54; optimally update its estimates of states based on these measurements using its synchronization controller 55; and manage a set of states stored in a covariance matrix 57. The stored states are used for synchronization and represent the time error of each base station 30 relative to a reference, the rate of change of each time error, and the transmission delay between base stations 30.

The RNC 36 also manages a set of measurements stored in a database 59 comprising: time of arrival of a measured waveform (i.e. sync burst); time difference of arrival of transmissions from two base stations as measured by a UE 20; and estimates of state uncertainties and measurement uncertainties. The RNC 36 uses advanced filtering, such as Kalman filters, to estimate parameters that define relative clock drift, and to refine parameters such as exact range between one element and another. The estimated time drift is used to infer the frequency mismatch between the frequency references of the respective base stations and reasonableness checks to ensure that occasional, grossly inaccurate measurements do not corrupt the process.

The RNC 36 assigns a time quality to each base station $30_1 \ldots 30_n$. This time quality is measured by the RNC 36 by selecting one base station as the time base reference for all others. All other base stations are assigned a variable time quality that is updated based on measurements and applied corrections. The time quality may be an integer (e.g., 0 to 10). A lower quality value implies a better accuracy. Alternately, the quality may be a continuous (floating point) variable. The reference base station (master base station) is preferably, permanently assigned a quality of 0. All other remaining base stations are assigned values which vary and are adjusted with respect to the reference base station. To illustrate this time quality hierarchical design, FIG. 4 displays a master base station wherein all base stations slave 1, slave 2, slave 3, are assigned time quality values which vary with respect to the master base station. In one embodiment the time quality of slave 2 base stations are assigned values which vary with respect to the slave 1 base stations and slave 3 base stations are assigned values which vary with respect to slave 2 base stations.

The normal mode of operation of the RNC 36 updates a covariance matrix 57 for the states stored in the RNC database 59, once per a predetermined time unit (e.g. once per five seconds or a time determined by an operator). One element of the covariance matrix 57 is the estimated variance of each base station's time error.

When a base station's time error variance exceeds a predetermined threshold, the RNC 36 initiates a message to support that base station's time error update. The update is performed in one of three ways: first, the subject base station is instructed to measure the base station time of arrival (BSTOA) of a sync burst from a neighboring base station $30_1$ $30_2$ ... $30_n$; second, a neighbor base station $30_1$, $30_2$ ... $30_n$ with better quality is instructed to measure BSTOA of the subject base station's transmission; or third, a UE 20 measures the BSTOA of sync bursts of that base stations and a neighboring base station $30_1$, $30_2$ ... $30_n$.

Figure 3:
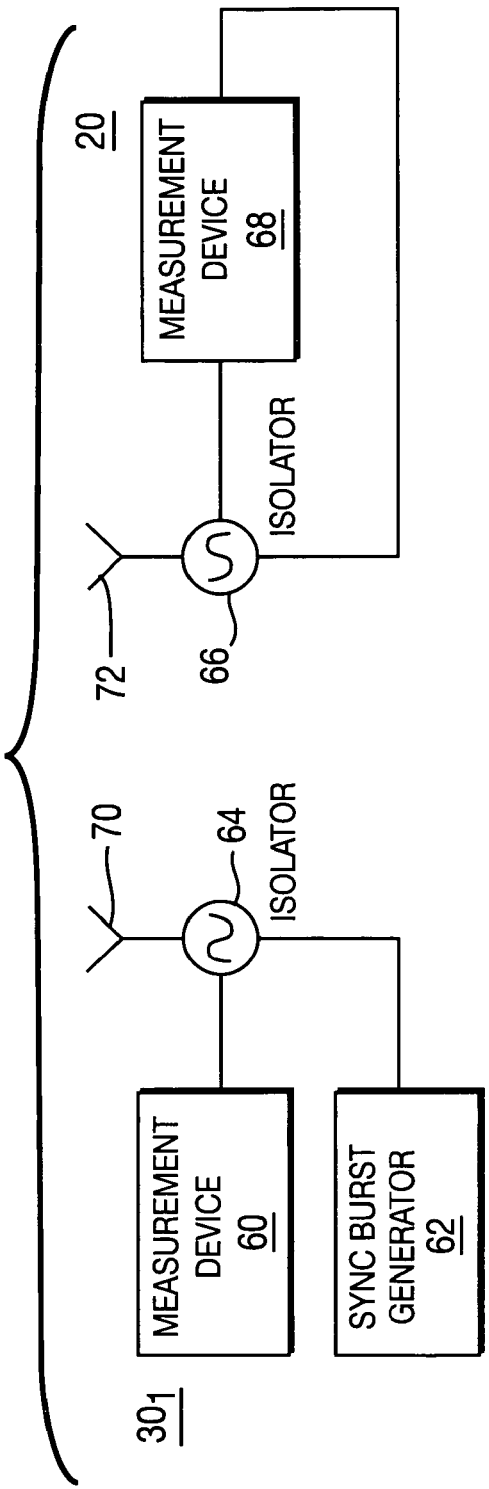
FIG. 3 is a block diagram of a base station and UE made in accordance with a preferred embodiment of the present invention.

In the first and second approaches using base station to base station BSTOA, the time of arrival of one base station transmission to another is observed. Referring to FIG. 3, a transmitting base station $30_1$ sends a known transmission pattern at a predefined time. This transmission pattern may be a sync burst from the sync burst generator 62 of the base station $30_1$, which passes through an isolator 64 prior to being radiated by an antenna 70. The receiving base station $30_1$ detects the transmitted waveform using its measurement device 60 which outputs a large value when the received signal coincides with the expected signature. If the receiver and transmitter were at the same location and had precisely synchronized clocks, the output of the measurement device 60 would occur at the same time as the transmitted waveform. However, clock misalignment and transmission path delay causes a time difference.

Transmission path delay is defined as per Equation 1:

$$R/c + x \qquad \text{Equation 1}$$

R/c is the distance, R, between a transmitting unit and receiving unit divided by the speed of light, c. The term x accounts for equipment delays. When base stations are very far apart the quantity, R/c typically dominates. Radio waves travel at the speed of light, approximately 1 foot per nanosecond, or $3 \times 10^8$ meters per second. The objective of base station synchronization is to align the base stations to within 1-3 microseconds. Therefore, when base stations are separated by distances on the order of ½ mile (1 km) or more, the distances are significant. However, for pico or micro cells, separated by tens of meters, the distances are insignificant compared to the measurement accuracies, x, which dominates.

Based on these considerations, when attempting to synchronize base stations far apart (more than 1 km) the knowledge of the separation is important. When attempting to synchronize base stations within 50 meters or so, the exact positions become irrelevant. After the measurement of BSTOA is performed, the known propagation distance stored in the RNC database 59 is subtracted and the difference is considered the misalignment in time between the base stations.

The third approach measures the relative time difference of arrival (TDOA) between two transmissions sent by two different base stations as observed by a UE. The UE measures and reports the observed TDOA between transmissions from two base stations. The RNC 36 sends a message to the UE 20, 22, 24 to measure the TDOA of two base stations. Upon receipt of this message, the UE 20, 22, 24 receives the transmission of the two base stations, via its antenna 72 and isolator 64, and measures the TDOA using the UE measure receive device 68 and transmits the measurements to its associated base station.

If the UE position is known (i.e. its range to each of the two base stations r1 and r2 is known) and both base stations timing is correct, the time difference of arrival (TDOA) is defined as per Equation 2.

$$(r1-r2)/c \qquad \text{Equation 2}$$

Measured deviations from this value would be an indicator of time base misalignment. As those skilled in the art know, if the ranges r1 and r2 are sufficiently small as would be true for pico-sized cells, it would not be necessary to know their values. Observed time difference of arrival could be used directly as a measure of time difference of transmission.

Once an approach is chosen, the appropriate message is transmitted to either a base station $30_1$ ... $30_n$ or a UE 22, 24, 20. If the message is sent to a base station $30_2$, the base station $30_2$ is told which neighbor to monitor and measure. If the message is to a UE 22, the UE 22 is told which base station to measure in addition to its own base station.

Referring back to FIG. 2, the RNC 36 has stored the range between each base station $30_1$ ... $30_n$ within its database 59. It subsequently checks to see if there is a neighbor base station $30_1$ which has a better time quality than the base station $30_2$ to be updated. Once such a neighbor base station $30_1$ is found, a message is initiated to the neighboring base station $30_1$ to take a measurement from the "out of sync" base station $30_2$. Alternatively, the RNC 36 is able to send a message to the "out of sync" base station $30_2$ and request that it take a measurement of the neighboring base station $30_1$. The requested base station, for purposes of this embodiment, the "out of sync" base station $30_2$, then takes the measurement of the "in-sync" base station $30_1$ and sends the measured value back to the RNC measurement device 54. The RNC measurement device 54 forwards the measured value to the synchronization controller 55 which computes the time of transmission of the measurement by subtracting the propagation time R/C.

Once the time of transmission is calculated by the RNC synchronization controller 55, the value is compared to the value stored in the RNC database 59. The RNC synchronization controller 55 then computes Kalman filter gains and updates the states in the covariance matrix 57 using the difference between the calculated and predetermined time of arrival and the common gains. If the difference is beyond a certain threshold, the RNC message generator 53 will then send another message to the "out of sync" base station $30_2$ to adjust its time base or its reference frequency in order to get "in sync" with the other base station $30_3$ ... $30_n$ under the control of the RNC 36.

Figure 4:
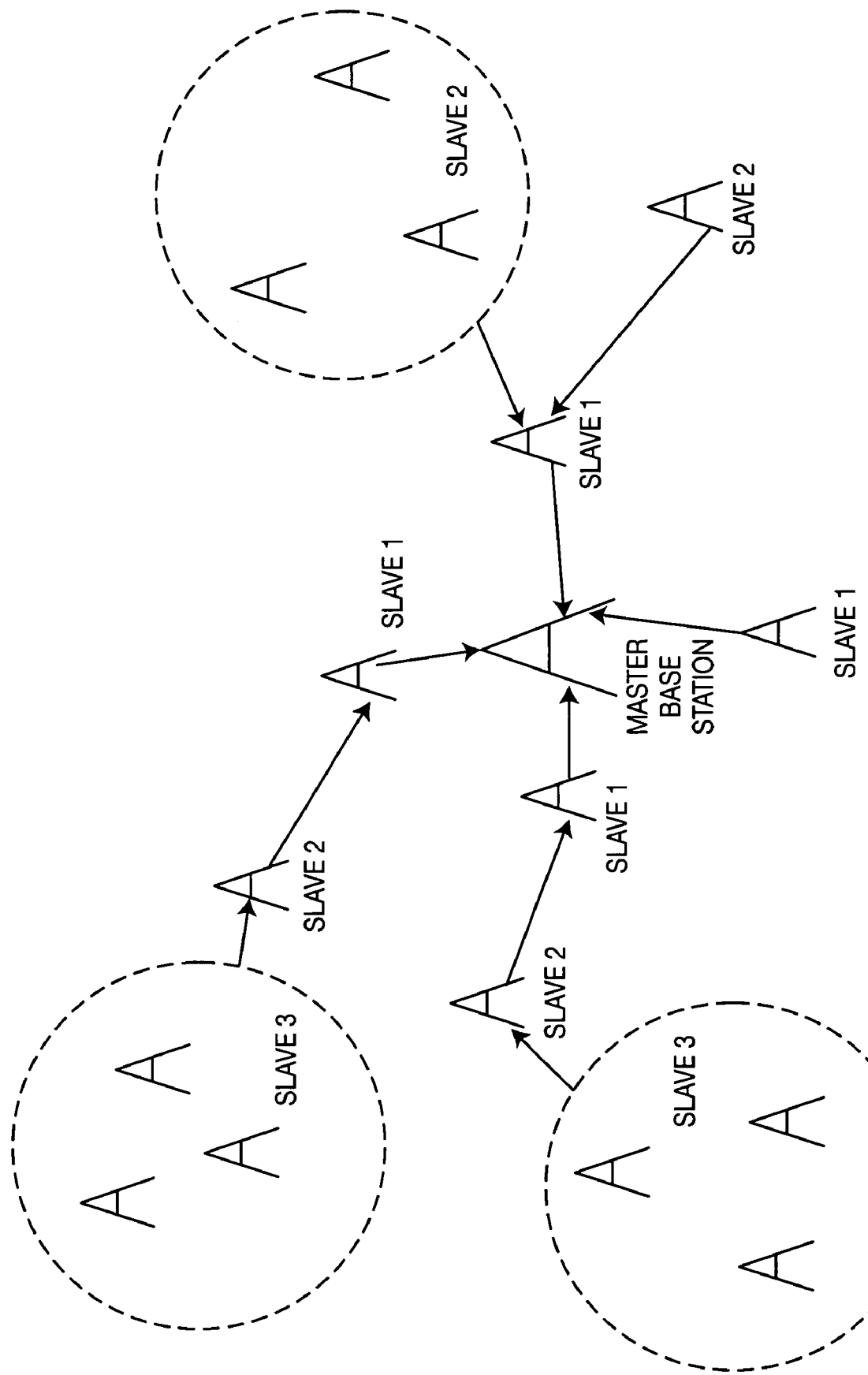
FIG. 4 is an illustration of the hierarchal time quality design made in accordance with a preferred embodiment of the present invention.

The base station $30_2$ conducts the requested adjustment and reports it back to the RNC measurement device 54. The databases within the RNC 36 is updated, including a correction to the subject base station's $30_2$ time reference, its time rate of change, an update of its covariance matrix 57 (including, most significantly, its estimated RMS time error and drift error), and an update to its time quality. Referring to FIG. 4, a base station whose time base is corrected based on a comparison to another base station, must never be assigned a quality equal to or better than that of a base station to which it is a slave to. This procedure guarantees stability. To illustrate, if a slave 2 base station is to be corrected, the slave 2 base station can only be assigned a value less than that of time quality of its slave 1 base station. This ensures that the time quality of a base station will not synchronize to a slave base station of the same level or less which could eventually lead to a cluster of base stations drifting "out of sync" with the master base station.

As disclosed earlier, another approach of taking measurements in order to adjust the "out of sync" base station $30_2$ uses an UE 20, 22, 24. If this method is chosen by the RNC 36, a message is sent to the UE 22 to measure the sync burst of the "out of sync" base station $30_2$ and the "in sync" base station $30_1$. Once the measurement is taken by the UE 22, the measurements are sent to the RNC 36 and processed. Similar to the methods described above, the measurements are compared to the known measurements stored in the RNC database 56 and covariance matrix 57 and an adjustment measurement sent to the "out of sync" base station $30_2$.

Figure 5A:
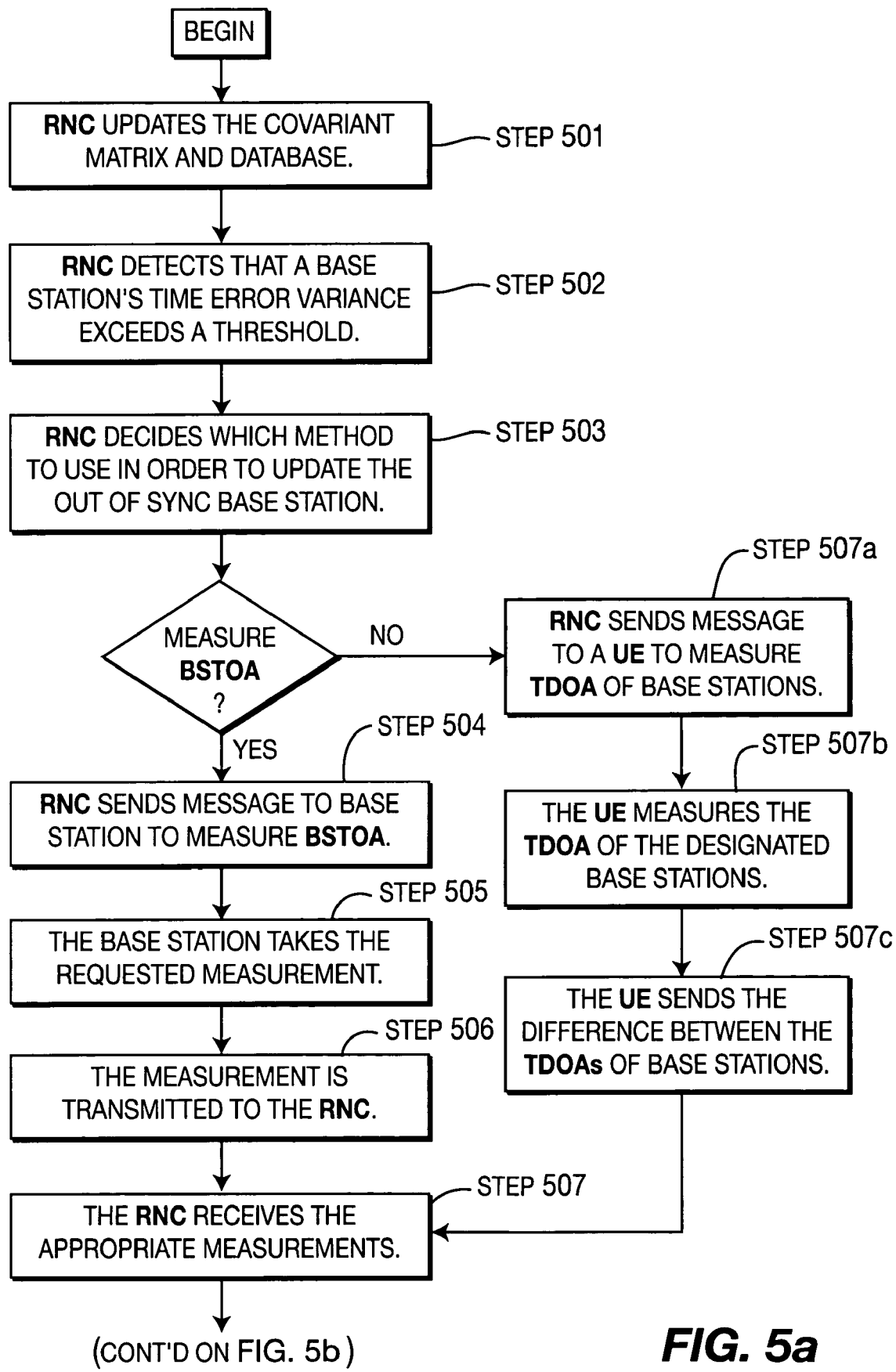
FIGS. 5a and 5b is a flow diagram of the system in accordance with a preferred embodiment of the present invention.
Figure 5B:
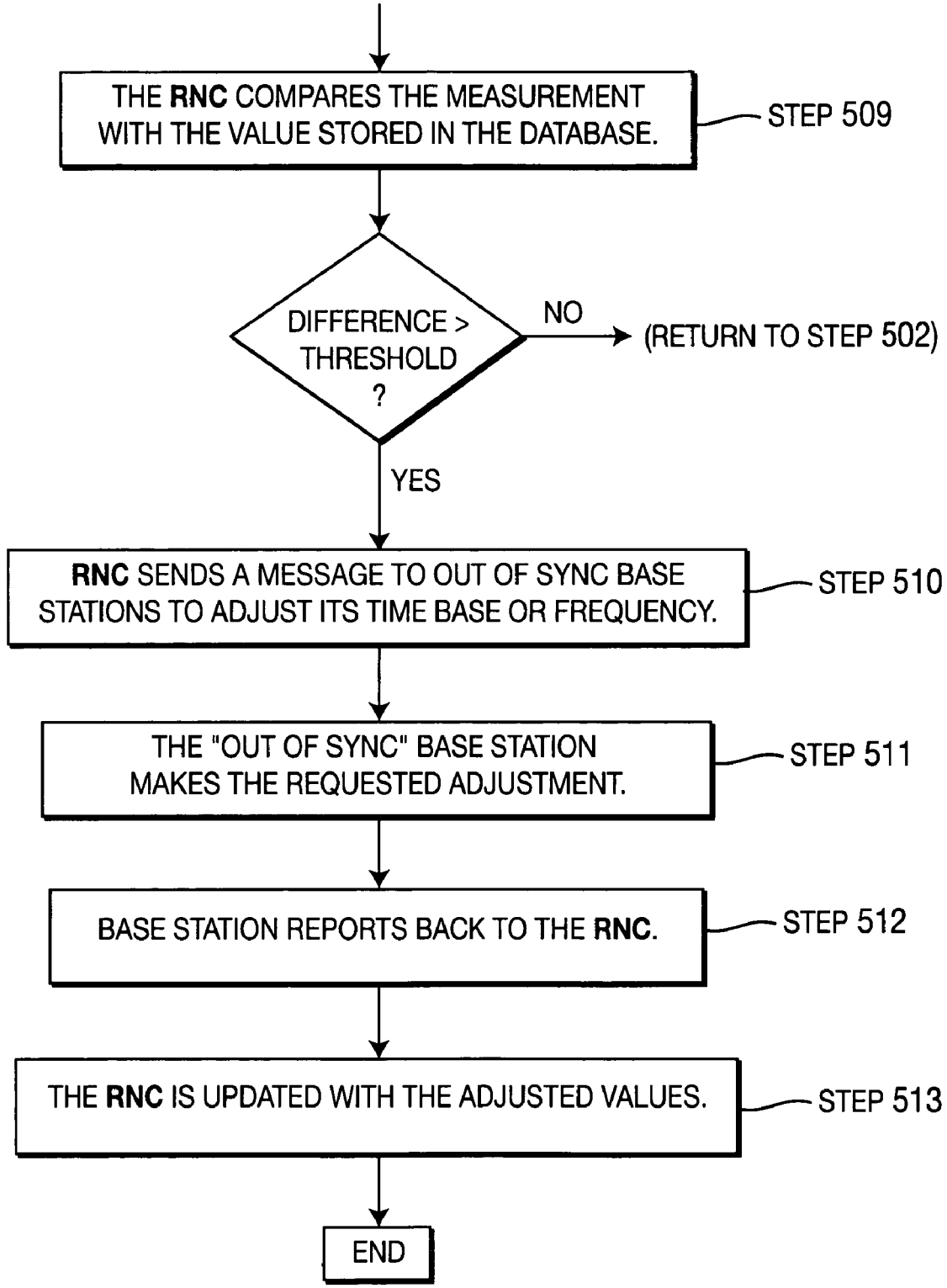

The flow diagram of the system in accordance with the preferred embodiment is illustrated in FIG. 5a and 5b. The RNC 36 updates the covariant matrix 57 and database 59 once per unit time (step 501). When the RNC 36 detects that a base station's $30_2 \ldots 30_n$ time error variance exceeds a predetermined threshold (step 502), the RNC 36 decides whether to use a base station to measure BSTOA or a UE to measure TDOA in order to update the "out of sync" base station's time error variance (step 503). If the RNC 36 decides to measure BSTOA, a message is sent to a neighboring base station of the "out of sync" base station to measure the base station time of arrival, or the message is sent to the "out of sync" base station to measure the time of arrival of the neighboring base station (step 504). The appropriate base station takes the necessary measurement (step 505) and transmits the measurement to the RNC 36 (step 506). If the RNC 36 decides to measure TDOA, the RNC 36 sends a message to a UE to measure the time difference of arrival of two base stations (step 507a), one being the "out of sync" base station. The UE measures the TDOA of each base station (step 507b) and sends the difference of these measurements to the RNC 36 (step 507c). Upon receipt by the RNC 36 of the appropriate measurements (step 508), the RNC 36 compares the measurement to the value stored in the RNC database 59 (step 509). If the difference is beyond a certain threshold, the RNC 36 sends a message to the "out of sync" base station to adjust its time base or its reference frequency (step 510) in accordance with this difference. The "out of sync" base station conducts the requested adjustment (step 511) and reports it back to the RNC 36 (step 512). The RNC database 59 and covariance matrix 57 are then updated to incorporate the new values (step 513).

A preferred embodiment is a system and method that resides in each RNC 36. In the prior art, a controlling radio network controller (C-RNC) communicates directly with its base stations and a serving radio network controller (S-RNC) communicates directly with its UEs. For cases where neighboring base stations are under control of different radio network controllers (RNC), there may be a need to add communication between the C-RNCs and S-RNCs that control the neighboring base stations and UEs.

An alternative embodiment requires each pair of base stations that can hear each other to move its own frequency closer to that of the other. The relative amount of adjustment is defined by a set of unique weights which are assigned to each base station and stored in the RNC database 59. The process of adjusting each of the base stations is the same as disclosed in the preferred embodiment above except that both the "in sync" and "out of sync" base stations are adjusted based on the weights assigned to the respective base stations. With different weights, one can achieve varying degrees of centrality, between the fully central to the fully distributed.

The most preferred embodiment enables an RNC 36 to send time corrections and/or frequency corrections to a base station $30_1 \ldots 30_n$. The master base station is responsible to ensure that each of its base stations have a time reference slaved to it, accurate within a specified limit. The RNC 36, in its algorithms and corrections, assumes that there is negligible error existing between the master base station and its base stations and therefore assumes that all base stations have the same time reference.

As a consequence, the RNC 36 does not attempt to estimate the individual time errors between the master base station and its base stations and the master base station must eliminate or compensate for timing errors between the master base station and each of the other base stations, since the associated RNC 36 does not perform a correction. This embodiment presents a clean interface between an RNC 36 and a master base station. It enables the master base station to apply its own solution to slave synchronization which is well suited to pico-cells.

In an alternative embodiment, each base station has an independent time and frequency reference which enables an RNC 36 to send time corrections and/or frequency corrections to each base station. The RNC 36, in its algorithms and corrections, estimates the states which represent the time and frequency error of each base station.

As a consequence, the RNC 36 attempts to estimate the individual time errors between each base station and the master base station, measurements involving one base station provide no benefit to estimating the states of another base station. Therefore, the base station manufacturer need only provide loosely bounded errors in the timing and time drift of the base stations, and every base station must have an acceptable connectivity over the air to another base station (same or different base station).

This alternative embodiment benefits large cellular areas where the distance between base stations are far. The ability to correct one base station slaved to the time reference of a master base station through measurements involving another base station slaved to the same master base station is limited.

Each base station in this alternative embodiment uses independent time references but the master base station provides a frequency reference. An RNC 36 sends time corrections for each base station individually and/or a single frequency correction to a master base station. The RNC 36 ensures that the clock of each base station is slaved in frequency to the clock of the master base station. The RNC 36, in its algorithms and corrections, assumes that there is negligible drift error between the master base station and its assigned base stations, but estimates offsets which are treated as constant.

As a consequence, the RNC 36 estimates the individual time errors between the master base station and its base stations and the common frequency drift of the base stations with regard to the master base station.

This alternative embodiment has features similar to those described in the previous alternative embodiment where base stations that are far from the master base station benefit. This embodiment provides a mechanism to remove time mismatches in long distances. Taking advantage of the assumption that these time offsets are stable, this embodiment takes advantage of a measurement involving any base station slaved frequency to the clock of the master base station, to update the drift rate for all base stations slaved to the same master base station.

Another alternative embodiment has the RNC 36 providing estimates to the master base station to support its synchronization of the base stations slaved to it. An RNC 36 sends time corrections and/or frequency corrections for each associated base station to its respective master base station. The master base station ensures that its associated base stations each have a time reference slaved to itself, accurate within a specified limit. The master base station may elect to use the base station-unique estimates to aid in the base station synchronization. The RNC 36, in its algorithms and corrections, creates a best estimate of the time and frequency error between the master base station and its base stations. In performing state estimates it weighs the relative confidence between the measurements and the base station error uncertainty.

As a consequence, the RNC 36 attempts to estimate the individual time errors between the master base station and its base stations, and the master base station eliminates and/or compensates for timing errors between the master base station and each base station slaved to its time reference, or requests assistance from the RNC 36.

While the present invention has been described in terms of the preferred embodiments, other variations which are within the scope of the invention as outlined in the claims below will be apparent to those skilled in the art.

What is claimed is:

1. A method, implemented in a radio network controller (RNC), for maintaining synchronization of base stations, the method comprising:
   updating a covariant matrix and a database;
   detecting that a time error variance of a first base station exceeds a predetermined threshold;
   transmitting a signal to instruct a user equipment (UE) to measure a time difference of arrival (TDOA) between signals transmitted from the first base station and a reference base station;
   receiving the TDOA measurement;
   comparing the TDOA measurement with a value stored in the database; and
   transmitting a message to the first base station to adjust its transmission timing based on said comparison.

2. The method of claim 1, wherein the covariant matrix maintains a state estimate of each base station associated with the RNC, said state estimates including a time error of each base station relative to a reference, a rate of change of each time error, and a transmission delay between base station pairs.

3. The method of claim 2, wherein the database maintains previously received TDOA measurement values, and a time reference and time rate of change of each of the plurality of base stations.

4. The method of claim 3, further comprising determining whether a difference between the measured TDOA value and a TDOA value stored in the database exceeds a predetermined TDOA threshold; and transmitting an adjustment message to the first base station if said difference exceeds said predetermined TDOA threshold.

5. The method of claim 4, further comprising:
   receiving an adjustment report, wherein the adjustment report includes that a transmission timing of the first base station has been adjusted according to the transmitted adjustment message; and
   updating the database and covariant matrix according to said adjustment.

6. The method of claim 5, wherein the reference base station is a master base station in a node B, and wherein the first base station is slaved to said master base station.

7. An RNC configured to maintain base stations synchronized, wherein said base stations are within a node B, the RNC comprising:
   a covariant matrix configured to maintain a state estimate of each of a plurality of base stations, and wherein said state estimates include a time error of each base station relative to a reference, a rate of change of each time error, and a transmission delay between base station pairs;
   a database configured to maintain received TDOA measurement values between signals transmitted from a first base station and a reference base station;
   a message generator configured to generate and transmit measurement-request messages;
   a measurement receive device configured to receive and process received TDOA measurement values; and
   a synchronization controller configured to compute a time of transmission of each of the base stations and filter gains based on received TDOA measurement values.

8. The RNC of claim 7, wherein the synchronization controller is further configured to determine whether a difference between the received TDOA value and a TDOA value stored in the database exceeds a predetermined threshold.

9. The RNC of claim 8, wherein the message generator is further configured to generate and transmit adjustment messages according to a determined difference between the received TDOA value and the stored TDOA value.

10. The RNC of claim 9, wherein the measurement receive device is further configured to receive and process reporting messages responsive to transmitted adjustment messages.

11. The RNC of claim 10, wherein the synchronization controller is further configured to update the state estimates in the covariance matrix and update the database with received TDOA values.

* * * * *

UNITED STATES PATENT AND TRADEMARK OFFICE
CERTIFICATE OF CORRECTION

PATENT NO. : 7,379,518 B2
APPLICATION NO. : 11/257534
DATED : May 27, 2008
INVENTOR(S) : Dick et al.

It is certified that error appears in the above-identified patent and that said Letters Patent is hereby corrected as shown below:

Title Page, Item (56), FOREIGN PATENT DOCUMENTS, page 2, left column, after the line "JP 08-163002 6/1996", delete "JP 0852430 7/1998".

Title Page, Item (56), FOREIGN PATENT DOCUMENTS, page 2, left column, after the line "JP 10-246769 9/1998", delete "JP 0954122 11/1999".

Title Page, Item (56), OTHER PUBLICATIONS, page 1, right column, line 1, before the words "of Cell", delete "Comparision" and insert therefor --Comparison--.

Title Page, Item (56), OTHER PUBLICATIONS, page 2, right column, line 18, after "(3G TS 25.211", delete "cersion" and insert therefor --version--.

Title Page, Item (56), OTHER PUBLICATIONS, page 2, right column, line 28, after the word "Network", delete "Apreading" and insert therefor --Spreading--.

Title Page, Item (56), OTHER PUBLICATIONS, page 2, right column, line 71, before the word "physical", delete "into" and insert therefor --onto--.

Title Page, Item (56), OTHER PUBLICATIONS, page 3, left column, line 8, before the word "Vehicular", delete "$52^{52}$" and insert therefor --$52^{nd}$--.

Title Page, Item (56), OTHER PUBLICATIONS, page 3, left column, line 10, before "et al", delete "Nystrom" and insert therefor --Nyström--.

Title Page, Item (56), OTHER PUBLICATIONS, page 3, left column, line 25, after the words "for Cell", delete "Redelection" and insert therefor --Reselection--.

Title Page, Item (56), OTHER PUBLICATIONS, page 3, left column, line 29, after the words "for Cell", delete "Redelection" and insert therefor --Reselection--.

Title Page, Item (56), OTHER PUBLICATIONS, page 3, left column, line 33, after the words "for Cell", delete "Redelection" and insert therefor --Reselection--.

Title Page, Item (56), OTHER PUBLICATIONS, page 3, left column, line 34, after "3GPP TS 25.304", delete "V3.6.0" and insert therefor --V3.5.0--.

Title Page, Item (56), OTHER PUBLICATIONS, page 3, right column, line 28, after the words "Initial Cell", delete "Research" and insert therefor --Search--.

Title Page, Item (56), OTHER PUBLICATIONS, page 3, right column, line 31, before "et al.," delete "Nystrom" and insert therefor --Nyström--.

UNITED STATES PATENT AND TRADEMARK OFFICE
CERTIFICATE OF CORRECTION

PATENT NO. : 7,379,518 B2
APPLICATION NO. : 11/257534
DATED : May 27, 2008
INVENTOR(S) : Dick et al.

It is certified that error appears in the above-identified patent and that said Letters Patent is hereby corrected as shown below:

IN THE SPECIFICATION

At column 2, line 7, before the words "is a flow", insert --, taken together,--.

At column 3, line 27, after "$30_1$", insert --,--.

At column 3, line 31, before the words "and a", delete "stations", and insert therefor --station--.

At column 4, line 20, after the words "both base", delete "stations", and insert therefor --stations'--.

At column 5, line 3, before the word "updated", delete "is", and insert therefor --are--.

At column 5, line 21, after the word "uses", delete "an", and insert therefor --a--.

At column 5, line 31, after the words "illustrated in", delete "FIG.", and insert therefor --FIGs.--.

Signed and Sealed this

Twenty-third Day of September, 2008

JON W. DUDAS
*Director of the United States Patent and Trademark Office*